(12) United States Patent
Wiggins et al.

(10) Patent No.: US 6,576,736 B2
(45) Date of Patent: Jun. 10, 2003

(54) COMPOUNDS AND COMPOSITIONS USEFUL AS SURFACTANTS AND METHODS FOR THEIR PREPARATION

(75) Inventors: Michael S. Wiggins, Lansdale, PA (US); Ronald W. Broadbent, Horsham, PA (US); Ramesh L. Narayan, Harleysville, PA (US); Ayaz Khan, Upper Darby, PA (US)

(73) Assignee: Cognis Corporation, Gulph Mills, PA (US)

( * ) Notice: Subject to any disclaimer, the term of this patent is extended or adjusted under 35 U.S.C. 154(b) by 0 days.

(21) Appl. No.: 10/091,798

(22) Filed: Mar. 6, 2002

(65) Prior Publication Data

US 2002/0169258 A1 Nov. 14, 2002

Related U.S. Application Data

(60) Provisional application No. 60/282,361, filed on Apr. 6, 2001.

(51) Int. Cl.[7] ............. B01D 19/04; C08G 18/32; C08G 65/331; C08G 65/333; C08K 3/20
(52) U.S. Cl. ............. 528/29; 516/123; 516/124; 516/125; 516/129; 516/133; 516/134; 523/403; 528/28; 528/68; 528/76; 528/77; 528/301; 528/374; 528/391; 528/397; 528/400; 528/421
(58) Field of Search ............. 528/28, 29, 68, 528/76, 77, 301, 374, 391, 397, 400, 421; 516/123, 124, 125, 129, 133, 134; 523/403

(56) References Cited

U.S. PATENT DOCUMENTS

| | | | |
|---|---|---|---|
| 4,273,913 A | 6/1981 | Wood et al. | 528/77 |
| 4,281,199 A | 7/1981 | Langdon | 564/475 |
| 4,978,805 A | 12/1990 | Baur et al. | 568/622 |
| 5,827,453 A | 10/1998 | Gross et al. | 252/321 |
| 5,880,222 A | 3/1999 | Wiggins et al. | 525/407 |
| 6,362,259 B1 | 3/2002 | Natale et al. | 524/114 |

| | | | |
|---|---|---|---|
| 2001/0027227 A1 | 10/2001 | Breindel et al. | |
| 2001/0031813 A1 | 10/2001 | Breindel et al. | |
| 2002/0040066 A1 | 4/2002 | Khan et al. | |

FOREIGN PATENT DOCUMENTS

| | | |
|---|---|---|
| FR | 1466708 | 1/1967 |
| WO | 92/03606 | 3/1992 |

*Primary Examiner*—Robert E. L. Sellers
(74) *Attorney, Agent, or Firm*—John E. Drach; Henry E. Millson, Jr.

(57) ABSTRACT

Products of the reaction between

I) the reaction product of reactants comprising
  A) a linking agent of formula I $$R^4(Y)_3 \qquad (I)$$

wherein each Y group is a halogen atom or one Y group is a halogen atom and two Y groups represent an oxygen atom, which is attached to two adjacent carbon atoms in the $R^4$ group to form an epoxy group, and $R^4$ is an alkanetriyl group containing from 3 to 10 carbon atoms; and B) a compound formula II $$R^3(EO)_n(PO)_m(BO)_pX \qquad (II)$$

wherein $R^3$ is a substituted or unsubstituted, saturated or unsaturated, aliphatic or araliphatic oxy or thio group having from 1 to 36 carbon atoms or a secondary amino group having from 2 to 36 carbon atoms; n is a number of from 0 to 50; m is a number of from 0 to 50; p is a number of from 0 to 50; and X is hydrogen, or X can be a mercapto group or an amino group in place of a terminal —OH group, provided that when X is mercapto or amino; the sum of n, m, and p must be at least 1; and the mole ratio of A:B is from about 0.2:1 to about 5:1; and II) a reactant selected from the group consisting of an epoxy compound, an isocyanate, a phosphate compound, a sulfate compound, an organic acid, an acrylate, and methylol urea.

53 Claims, No Drawings

COMPOUNDS AND COMPOSITIONS USEFUL AS SURFACTANTS AND METHODS FOR THEIR PREPARATION

CROSS-REFERENCE TO RELATED APPLICATIONS

This application claims the benefit of copending provisional application serial No. 60/282,361, filed on Apr. 6, 2001, the entire contents of which are incorporated herein by reference.

FIELD OF THE INVENTION

This invention relates to surfactants, defoaming agents, and wetting agents useful in both aqueous and nonaqueous compositions.

BACKGROUND OF THE INVENTION

Many aqueous and nonaqueous compositions, such as latex paints and oil-based paints, exhibit problems with foaming, resulting in the encapsulation of air in the liquid paints and in the coatings obtained therefrom.

There is a continuing need for surfactants that can be employed as defoaming agents in both aqueous and nonaqueous compositions. There is also a continuing need for defoaming agents and wetting agents.

SUMMARY OF THE INVENTION

The present invention relates to compounds useful as low foaming surfactants, as well as defoaming agents and/or wetting agents, which are the products of the reaction between I) the reaction product of reactants comprising
   A) a linking agent of formula I

$$R^4(Y)_3 \quad (I)$$

wherein each Y group is a halogen atom or one Y group is a halogen atom and two Y groups represent an oxygen atom, which is attached to two adjacent carbon atoms in the $R^4$ group to form an epoxy group, and $R^4$ is an alkanetriyl group containing from 3 to 10 carbon atoms; and B) a compound of formula II

$$R^3(EO)_n(PO)_m(BO)_pX \quad (II)$$

wherein $R^3$ is a substituted or unsubstituted, saturated or unsaturated, aliphatic or araliphatic oxy or thio group having from 1 to 36 carbon atoms or a secondary amino group having from 2 to 36 carbon atoms; n is a number of from 0 to 50; m is a number of from 0 to 50; p is a number of from 0 to 50; and X is hydrogen, or X can be a mercapto group or an amino group in place of a terminal —OH group, provided that when X is mercapto or amino; the sum of n, m, and p must be at least 1; and the mole ratio of A:B is from about 0.2:1 to about 5:1; and II) a reactant selected from an epoxy compound, an isocyanate, a phosphate compound, a sulfate compound, an organic acid, an acrylate and a methylol urea.

The invention also relates to aqueous and nonaqueous solutions containing a surfactant-effective, and/or defoaming-effective, and/or wetting agent-effective quantity of the above reaction products.

It should be noted that reaction products I) are themselves polysurfactants, and are useful as such.

DESCRIPTION OF THE PREFERRED EMBODIMENTS

Other than in the operating examples, or where otherwise indicated, all numbers expressing quantities of ingredients or reaction conditions used herein are to be understood as modified in all instances by the term "about".

In the product of the reaction between linking agent A) and component B), the mole ratio of A:B is from 0.2:1 to 5:1, preferably from 0.4:1 to 2:1, and more preferably from 0.6:1 to 1.4:1.

The linking agent of formula I is preferably epichlorohydrin although other epihalohydrins can be used. Also, instead of chlorine in the epihalohydrins and the trihaloalkanes, the corresponding bromine and iodine compounds can also be used. Examples of trihaloalkanes are 1,2,3-trichloropropane, 1,2,4-trichlorobutane, 1,3,6-trichlorohexane and the like.

In the compounds of formula II, it is understood that EO stands for the residue of ethylene oxide and PO stands for the residue of propylene oxide and BO stands for the residue of butylene oxide.

When the X group of formula (II) is a mercapto group, the $R^3$ group will preferably have from about 4 to about 36 carbon atoms, examples of which include but are not limited to, alkoxylated dodecyl mercaptan and alkoxylated 1-hexadecanethiol.

The compounds of formula (II) can be alkoxylated or non-alkoxylated secondary amines. When the compounds of formula II are secondary amines, n is a number from 0 to 50, preferably from 1 to 50, m is a number from 0 to 50 and p is a number from 0 to 50, preferably from 1 to 50. Examples of the secondary amines useful for the purposes of the invention include but are not limited to, alkoxylated dibutyl amine, alkoxylated dicyclohexyl amine, alkoxylated diethylethanolamine, and alkoxylated dioctylamine.

The substituents that can be present on the substituted $R^3$ groups can be single or multiple substitutions such as a halogen substitution, for example Cl, Fl, I and Br, preferably trifluoro, which products therefrom are especially useful as wetting agents, a sulfur functionality such as a mercaptan or thio group; a nitrogen functionality such as an amine or amide functionality; an alcohol functionality, a silicon functionality such as a siloxane; an ether functionality; or any combination thereof.

In general, compounds of formula II wherein the sum of n, m, and p is at least 1, especially at least 2, are preferred.

When $R^3$ is a secondary amino group, the group preferably contains from 4 to 22 carbon atoms.

Also, when X is hydrogen p is preferably a number of from 1 to 50. When $R^3$ is a secondary amino group, p is preferably a number of from 1 to 50.

The nonoxy and nonthio components of the $R^3$ group can be any substituted or unsubstituted, saturated or unsaturated organic moiety having from 1 to 36 carbon atoms. Thus, the nonthio and the nonoxy components of the $R^3$ aliphatic group can be linear or branched alkyl groups, linear or branched alkenyl or alkynyl groups, saturated carbocyclic moieties, unsaturated carbocyclic moieties having one or more multiple bonds, saturated heterocyclic moieties, unsaturated heterocyclic moieties having one or more multiple bonds, substituted linear or branched alkyl groups, substituted linear or branched alkenyl or alkynyl groups, substituted saturated carbocyclic moieties, substituted unsaturated carbocyclic moieties having one or more multiple bonds, substituted saturated heterocyclic moieties, and substituted unsaturated heterocyclic moieties having one or more multiple bonds. Examples of the above include but are not limited to an alkyl group having from 4 to 22 carbon atoms, an alkenyl group having from 4 to 22 carbon atoms, and an alkynyl group having from 4 to 22 carbon atoms. $R^3$ can also be an arenyl group. Arenyl groups are alkyl-substituted aromatic radicals having a free valence at an alkyl carbon atom such as a benzylic group. Alkyl groups having from 4 to 12 carbon atoms are preferred, and alkyl groups having from 8 to 10 carbon atoms are most preferred. The degree of ethoxylation is preferably from 2 to about 50 with the most preferred being from about 4 to about 50 while the degree of propoxylation and butoxylation can vary from 0 to about 50, preferably from 1 to about 10. The degree of propoxylation and or butoxylation will be determined by the desired degree of solubility or miscibility in the aqueous or nonaqueous compositions of the invention. The solubility or miscibility will ultimately be determined by such factors as the number of carbon atoms in $R^3$ and the relative amounts EO, PO and BO.

Optionally, an additional component can be reacted with the linking agent of formula (I) and the compound of formula (II). A glycidyl ether or amine can be added to the reaction of formula (I) and formula (III). The amount of the glycidyl ether or glycidyl amine is from about 1 to about 20 mole percent based on the moles of formula (II) used in the reaction. When the glycidyl ether or glycidyl amine is added to the monofunctional starting material of formula II the ratio of formula I to formula II plus the glycidyl ether or glycidyl amine is preferably from about 0.8 to about 1.4. Examples of the glycidyl ethers include, but are not limited to, PEG 600 diglycidyl ether, TETRONIC™ 701 tetraglycidyl ether, triglycidyl di or triethanolamine, polyoxyethylene (POE) 200 tallow amine diglycidyl ether, propoxylated (POP10) trimethylol propane triglycidyl ether, propoxylated (POP7) pentaerythritol tetraglycidyl ether. Examples of glycidyl amines include, but are not limited to, tetraglycidyl 1,6-hexane diamine, tetraglycidyl JEFFAMINE™ EDR-148, and tetraglycidyl isophorone diamine.

The above reaction products I) can be obtained by the process disclosed in U.S. Pat. No. 5,827,453, the disclosures of which are expressly incorporated herein by reference.

The above reaction products I) are then reacted in a second step with a reactant II) selected from an epoxy compound, an isocyanate, a phosphate, a sulfate, a silicone compound, an organic acid, an acrylate, or methylol urea.

When reactant II) is an epoxy compound, the epoxy compound can be any epoxy compound other than a linking agent of formula I. The epoxy compound can have one or more epoxy groups. Preferred compounds have from 2 to 22 carbon atoms, preferably from 2 to 12 carbon atoms. The epoxy compounds are preferably unsubstituted, and can be straight chain or branched and can have one or more double bonds. A preferred epoxy compound is ethylene oxide. These reaction products, especially those obtained from ethylene oxide, have good water solubility, good detergency, low surface tension and CMC, and are low foaming.

The reaction between reaction products I) and the epoxy compounds can take place in an inert organic solvent such as a liquid hydrocarbon solvent, with the reaction proceeding well at ambient temperatures.

When reactant II) is an isocyanate, the isocyanate can be an aliphatic or aromatic mono- or poly-isocyanate. Aliphatic mono isocyanates are preferred, i.e. those having the structural formula RN=C=O, where R is a $C_1$–$C_{22}$, preferably $C_1$–$C_{12}$, straight or branched chain alkyl or alkenyl group.

Aromatic isocyanates can also be used, such as toluene diisocyanate, diphenylmethane 4,4-diisocyanate, and the like.

When reactant II) is a polyisocyanate with n-isocyanate functionality, and the reaction is carried out at an equivalent ratio of 1 OH:nNCO, the resulting reaction product is a carbonate with n−1 equivalents of unreacted isocyanate groups. This reaction product can optionally then be further reacted with hydroxy-functional acrylates or methacrylates to give a reaction product that can be used as a reactive monomer to improve flow and leveling in a UV or EB cured coating. This reactive monomer when cured is non-fugitive and becomes an integral part of the coating. These hydroxy-functional acrylates and methacrylates include 2-hydroxyethyl acrylate, 2-hydroxyethyl methacrylate, hydroxy-functional polyester acrylates, e.g. caprolactone adducts of 2-hydroxyethyl acrylates or methacrylates, β-hydroxy acrylates or methacrylates obtained by the reaction of an alkyl glycidyl ether with acrylic or methacrylic acid, and the like.

Also, reactant II) can be the reaction product of 1 mol of a diol with 1 mol of a dicarboxylic acid or anhydride, e.g. maleic anhydride and the like.

The reaction with the isocyanate and reaction product I) can take place in an inert solvent such as a liquid hydrocarbon solvent, at a temperature which is not critical but is preferably in the range of from 200 to 50° C.

When reactant II) is a phosphate, both inorganic and organic phosphate compounds can be used. Inorganic phosphate compounds include phosphorus pentoxide, phosphoric acid, acid phosphate salts such as mono- or di-sodium or potassium phosphate, and the like, resulting in low foaming surfactants that also have excellent defoaming and antifoaming properties.

Organic phosphate compounds include phosphate esters, i.e. those having the formula $R^1OP(O)(OR")(OR''')$ where at least one of the R groups is an organic group and at least one is hydrogen, while the remaining R group represents an organic group or hydrogen. The organic groups are preferably $C_1$–$C_{22}$, more preferably $C_1$–$C_{12}$ alkyl groups. Mono- and di-aryl phosphates can also be used, i.e. where one or two R groups is an aryl group such as phenyl or alkyl substituted phenyl.

The reaction between the phosphate compound and reaction product I) can take place in an aqueous medium, optionally in the presence of an alkali or alkaline earth metal hydroxide, preferably at a temperature in the range of from 300 to 100° C.

When reactant II) is a sulfate, the reactant can be sulfuric acid or an acid sulfate salt, e.g. a sodium or potassium hydrogen sulfate. The sulfate can also be an organic sulfate, e.g. sulfates of the formula $HR^1SO_4$, where $R^1$ is an alkyl or aryl group, such as a $C_1$–$C_{22}$ alkyl group or a phenyl or alkyl substituted phenyl group.

The reaction between the sulfate compound and reactant I) can be carried out as discussed above for phosphate compounds.

When reactant II) is a silicone compound, the silicone compound is preferably a siloxane glycidyl ether, e.g. polydimethyl siloxane diglycidyl ether.

The reaction products of reaction product I) and a siloxane glycidyl ether, e.g. polydimethyl siloxane diglycidyl ether, as reactant II) have excellent defoaming and wetting properties. When these products are combined with wax particles and used as an oil defoamer, fast bubble break and low percent air entrapment in latex paints is obtained. These products inhibit the generation of foam in both aqueous and nonaqueous solutions containing other surfactants, combined with low static surface tension.

Halosilanes can also be used, i.e. those of the formula $X_3Si(SiH_2)_n(SiY_3)_m$, where each X is hydrogen or halogen, each Y is hydrogen or halogen, provided that at least one X or Y is halogen, n is a number of from 0 to 10, and m is 0 or 1. The halogens are preferably chlorine, although other halogens are included, e.g. bromine and iodine.

When reactant II) is an alkoxy silane or a halosilane, the resulting product is a hyperbranched compound having excellent defoaming activity in both aqueous and nonaqueous solutions.

The reaction between reaction product I) and the silicone compound can take place in an inert organic solvent, such as a liquid hydrocarbon solvent, using a Lewis acid, e.g. $BF_3$ etherate, at a temperature of from 30° to 100° C.

When reactant II) is an organic acid, the organic acid can be an aliphatic or aromatic mono- or poly-carboxylic acid or anhydride. When the organic acid or anhydride is an aliphatic acid, the acid is preferably a fatty acid, containing from 4 to 22 carbon atoms, e.g. n-butyric acid, isobutyric acid, caproic acid, etc. Dicarboxylic acids and anhydrides include adipic, malonic, succinic, glutaric, oxalic, sebacic, maleic, fumaric, and the like. Aromatic acids and anhydrides include benzoic, phthalic and its isomers, and aliphatic acids having a phenyl substituent, such as phenyl acetic acid and other $C_1$–$C_{22}$ aliphatic carboxylic acids having a phenyl substituent on a carbon atom. Products from the reaction with dicarboxylic acids; and anhydrides result in products useful as surfactants and as ultraviolet (UV) and election beam (EB) curable coatings.

The reaction between reaction product I) and the organic acid can be carried out in an aqueous medium containing an alkali or alkaline earth hydroxide, at a temperature in the range of from 300° to 100° C.

When reactant II) is an acrylate, the acrylate preferably has the formula R—CH=CHCOOR$^1$, where R is a $C_1$–$C_{12}$ alkyl group, and $R^1$ is hydrogen or a $C_1$–$C_{12}$ alkyl group, or the COOR$^1$ group is instead an acyl halide group. Acrylic acid, methacrylic acid and acryloyl chloride are preferred for use herein.

The reaction between reaction product I) and the acrylate can take place in an inert organic solvent, such as a liquid hydrocarbon solvent, and at a temperature of from 200 to 80° C.

When reactant II) is methylolurea ($H_2NCONHCH_2OH$), the reaction between methylolurea and reaction product I) can be carried out in an aqueous medium, preferably in the presence of an alkali or alkaline earth metal hydroxide, and at a temperature of from 30° to 100° C.

Where reactant II) has more than one reactive group, the product of the invention can be further reacted. For example, if reactant II) is a diisocyanate, and the reaction is carried out at an equivalent ratio of 1OH:2NCO, the resulting product will have one unreacted NCO group. This unreacted NCO group can then be reacted with other reactants, such as hydroxy or amine containing compounds to give a urethane or a urea respectively, which compounds will have polysurfactant properties, and will be useful as low foaming surfactants and as defoaming and antifoaming agents.

The compounds of the invention are all useful as surfactants, as well as foam reducing agents, and/or wetting agents for aqueous and nonaqueous compositions, including latex paints, inks, adhesives, metal working compositions, and the like, as well as other utilities noted for particular products.

The invention will be illustrated but not limited by the following examples.

EXAMPLES

Example 1

1 Mole of isodecyl alcohol.4EO was reacted with 1.3 moles of NaOH at 140° C. under vacuum. Then 1.1 moles of epichlorohydrin was added and reacted for 120 minutes at 140° C. to form a polysurfactant with an average of 4.5 moles of isodecyl alcohol ethoxylate per mole of polysurfactant. The polysurfactant was neutralized with glycolic acid, washed with water, dried, and filtered.

The above polysurfactant was dried down at 100° C. under vacuum, then reacted with polydimethyl siloxane diglycidyl ether at a ratio of 1 epoxy equivalent per mole of OH, using 0.5 grams of $BF_3$ etherate as a catalyst without a solvent at a temperature of 50° C. to form a silicone-modified polysurfactant.

Example 2

1 Mole of isobutyl alcohol.3EO was reacted with 1.3 moles of NaOH at 140° C. under vacuum at a temperature of 140° C. Then 1.1 moles of epichlorohydrin was added and reacted at 140° C. for 120 minutes to form a polysurfactant having an average of 4.5 moles of isobutyl alcohol ethoxylate per mole of polysurfactant. The polysurfactant was neutralized with glycolic acid, washed with water, dried, and filtered. The polysurfactant was then reacted with toluene diisocyanate at a 1 NCO:1 OH equiv. basis at a temperature of 80° C. for 10 hours without a solvent to give a urethane modified polysurfactant.

Example 3

1 Mole of isodecyl alcohol.4EO is reacted with 1.3 moles of NaOH and then reacted with 1.1 moles of epichlorohydrin according to the process of Example 1. The resulting polysurfactant is then reacted with acryloyl chloride (1 OH:1 acryloyl chloride equivalents) at a temperature of 0° C. for 120 minutes without a solvent. An acrylate ester is obtained which can be further copolymerized with other acrylates.

Example 4

1 Mole of isononyl phenol.6EO was reacted with 1.3 moles of NaOH at 140° C. under vacuum for 4 hours. Then 1.1 moles of epichlorohydrin were added and reacted at 140° C. for 2 hours. The resulting polysurfactant was neutralized with glycolic acid, washed with water and filtered.

Then the polysurfactant was dried at 200° C. under vacuum for 2 hours, then cooled and reacted with $P_2O_5$ (1 OH equiv. per 0.5 moles of $P_2O_5$) at ambient temperature to give a mixture of phosphate mono, di, and tri esters.

Example 5

1 Mole of isodecyl alcohol.4EO is reacted with 1.3 moles of NaOH at a temperature of 140° C. for 4 hours. Then 1.1 moles of epichlorohydrin is added and reacted at 140° C. for 2 hours to form a polysurfactant having an average of 4.5 moles of isodecyl alcohol ethoxylate per mole of polysurfactant. The polysurfactant is neutralized with glycolic acid, washed with water, and dried. The polysurfactant is then reacted with dimethylol urea (1 equiv. dimethylol urea per 1 equiv. OH in the polysurfactant) to give a urea-modified polysurfactant.

Example 6

A polysurfactant is formed according to the process of Example 5, and then reacted at 140–160° C. for 6 hours with 5 moles of ethylene oxide per mole of polysurfactant using 0.3% NaOH to give a highly branched low foaming nonionic surfactant.

Example 7

A polysurfactant was formed according to the process of Example 5, and then reacted with toluene diisocyanate (1 equiv. OH:1 mole of toluene diisocyanate) and one molar equivalent of 2-hydroxyethyl acrylate at a temperature of 80° C. for 6 hours. A copolymerizable polysurfactant was obtained that can be cured using heat and peroxides or using a photocatalyst such as benzoin or alpha, alpha-dimethoxy-alpha-phenyl acetophenone, or can be cured without catalysts using ultraviolet light or electron beam radiation.

What is claimed is:

1. A product of the reaction between
   I) the reaction product of reactants comprising
      A) a linking agent of formula I

wherein each Y group is a halogen atom or one Y group is a halogen atom and two Y groups represent an oxygen atom, which is attached to two adjacent carbon atoms in the $R^4$ group to form an epoxy group, and $R^4$ is an alkanetriyl group containing from 3 to 10 carbon atoms; and
      B) a compound of formula II

wherein $R^3$ is a substituted or unsubstituted, saturated or unsaturated, aliphatic or araliphatic oxy or thio group having from 1 to 36 carbon atoms or a secondary amino group having from 2 to 36 carbon atoms; n is a number of from 0 to 50; m is a number of from 0 to 50; p is a number of from 0 to 50; and X is hydrogen, or X can be a mercapto group or an amino group in place of a terminal —OH group, provided tat when X is mercapto or amino; the sum of n, m, and p must be at least 1; and the mole ratio of A:B is from about 0.2:1 to about 5:1; and when the $R^3$ group is a substituted group the substituents are selected from the group consisting of halogen, mercaptan, thio, amine, amide, siloxane, and ether groups; and
   II) a reactant selected from the group consisting of an epoxy compound, an isocyanate, a phosphate compound, a sulfate compound, a silicone compound, an organic acid, an acrylate, and methylol urea.

2. The product of claim 1 wherein component I) A) is epichlorohydrin.

3. The product of claim 1 wherein in component I) B), X is hydrogen.

4. The product of claim 1 wherein in component I) B), n is at least 2.

5. The product of claim 1 wherein in component I), the mole ratio of A:B is from about 0.4:1 to about 2:1.

6. The product of claim 1 wherein in component I) the mole ratio of A:B is from about 0.6:1 to about 1.4:1.

7. The product of claim 1 wherein in component I) B), X is an amino group.

8. The product of claim 1 wherein in component I) B), $R^3$ is a secondary amino group.

9. The product of claim 1 wherein in component I) B), X is a mercapto group.

10. The product of claim 1 wherein in component I) B), $R^3$ is an alkoxy group containing from 4 to 22 carbon atoms.

11. The product of claim 10 wherein the $R^3$ group contains from 4 to 12 carbon atoms.

12. In an aqueous composition comprising at least one surfactant, the improvement wherein at least one of the surfactants is a product of claim 1.

13. The aqueous composition of claim 12 wherein the composition is an aqueous latex composition.

14. In a liquid nonaqueous composition comprising at least one surfactant, the improvement wherein at least one of the surfactants is a product of claim 1.

15. A method for defoaming an aqueous composition comprising adding thereto a defoaming-effective amount of a product of claim 1.

16. A method for defoaming a liquid nonaqueous composition comprising adding thereto a defoaming-effective amount of a product of claim 1.

17. The product of claim 1 wherein component II) is an epoxy compound.

18. The product of claim 1 wherein component II) is an isocyanate.

19. The product of claim 1 wherein component II) is a phosphate.

20. The product of claim 1 wherein component II) is a sulfate.

21. The product of claim 1 wherein component II) is a silicone compound.

22. The product of claim 1 wherein component II) is an organic acid.

23. The product of claim 1 wherein component II) is an acrylate.

24. The product of claim 1 wherein component II) is a methylol urea.

25. The product of claim 1 wherein in component I) B), the $R^3$ group is an unsubstituted alkoxy group containing from 4 to 22 carbon atoms.

26. The product of claim 25 wherein the $R^3$ group contains from 4 to 12 carbon atoms.

27. A product of the reaction between
   I) the reaction product of reactants comprising
      A) a linking agent of formula I

wherein each Y group is a halogen atom or one Y group is a halogen atom and two Y groups represent an oxygen atom, which is attached to two adjacent carbon atoms in the $R^4$ group to form an epoxy group, and $R^4$ is an alkanetriyl group containing from 3 to 10 carbon atoms; and
      B) a compound of formula II

wherein $R^3$ is a substituted or unsubstituted, saturated or unsaturated, aliphatic or araliphatic oxy or thio group having from 1 to 36 carbon atoms or a secondary amino group having from 2 to 36 carbon atoms; n is a number of from 0 to 50; m is a number of from 0 to 50; p is a number of from 0 to 50; and X is hydrogen, or X can be a mercapto group or an amino group in place of a terminal —OH group, provided that when X is mercapto or amino, the sum of n, m, and p is at least 1; and the mole ratio of A:B is from about 0.2:1 to about 5:1; and II) a reactant selected from the group consisting of an epoxy compound, a phosphate compound, a sulfate compound, a silicone compound, an organic acid, an acrylate, and methylol urea.

28. The product of claim 27, wherein component I) A) is epichlorohydrin.

29. The product of claim 27 wherein in component I) B), X is hydrogen.

30. The product of claim 27 wherein in component I) B), n is at least 2.

31. The product of claim 27 wherein in component I), the mole ratio of A:B is from about 0.4:1 to about 2:1.

32. The product of claim 27 wherein in component I), the mole ratio of A:B is from about 0.6:1 to about 1.4:1.

33. The product of claim 27 wherein in component I) B), X is an amino group.

34. The product of claim 27 wherein in component I) B), $R^3$ is a secondary amino group.

35. The product of claim 27 wherein in component I) B), X is a mercapto group.

36. The product of claim 28 wherein in component I) B), $R^3$ an alkoxy group containing from 4 to 22 carbon atoms.

37. The product of claim 36 wherein the $R^3$ group contains from 4 to 12 carbon atoms.

38. The product of claim 27 wherein in component I) B), the $R^3$ group is an unsubstituted alkoxy group containing from 4 to 22 carbon atoms.

39. The product of claim 38 wherein the $R^3$ group contains from 4 to 12 carbon atoms.

40. In an aqueous composition comprising at least one surfactant, the improvement wherein at least one of the surfactants is a product of claim 27.

41. The aqueous composition of claim 40 wherein the composition is an aqueous latex composition.

42. In a liquid nonaqueous composition comprising at least one surfactant, the improvement wherein at least one of the surfactants is a product of claim 27.

43. A method for defoaming an aqueous composition comprising adding thereto a defoaming-effective amount of a product of claim 27.

44. A method for defoaming a liquid nonaqueous composition comprising adding thereto a defoaming-effective amount of a product of claim 27.

45. The product of claim 27 wherein component II) is an epoxy compound.

46. The product of claim 27 wherein component II) is a phosphate.

47. The product of claim 27 wherein component II) is a sulfate.

48. The product of claim 27 wherein component II) is a silicone compound.

49. The product of claim 27 wherein component II) is an organic acid.

50. The product of claim 27 wherein component II) is an acrylate.

51. The product of claim 27 wherein component II) is a methylol urea.

52. The product of claim 1 wherein in component I) B), the $R^3$ group is unsubstituted.

53. The product of claim 27 wherein in component I) B), the $R^3$ group is unsubstituted.

* * * * *